US010698522B2

(12) United States Patent
Pourbigharaz

(10) Patent No.: US 10,698,522 B2
(45) Date of Patent: Jun. 30, 2020

(54) VARIABLE RATE DISPLAY INTERFACES

(71) Applicant: QUALCOMM Incorporated, San Diego, CA (US)

(72) Inventor: Fariborz Pourbigharaz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 157 days.

(21) Appl. No.: 15/139,441

(22) Filed: Apr. 27, 2016

(65) Prior Publication Data

US 2017/0315652 A1 Nov. 2, 2017

(51) Int. Cl.
G06F 3/041 (2006.01)
G06F 13/42 (2006.01)
G06F 1/08 (2006.01)
G06F 3/00 (2006.01)

(52) U.S. Cl.
CPC .............. G06F 3/0416 (2013.01); G06F 1/08 (2013.01); G06F 3/005 (2013.01); G06F 13/4273 (2013.01); G06F 13/4291 (2013.01)

(58) Field of Classification Search
None
See application file for complete search history.

(56) References Cited

U.S. PATENT DOCUMENTS

| 6,564,269 | B1 * | 5/2003 | Martin | ................... | G09G 5/006 |
| | | | | | 348/E7.026 |
| 7,634,607 | B2 * | 12/2009 | Honda | ................ | G06F 13/4291 |
| | | | | | 345/204 |
| 9,086,749 | B2 | 7/2015 | Pourbigharaz et al. | | |
| 9,158,350 | B2 | 10/2015 | Tripathi et al. | | |
| 2005/0204057 | A1 * | 9/2005 | Anderson | ......... | H04L 29/06027 |
| | | | | | 709/236 |
| 2008/0259221 | A1 | 10/2008 | Longchambon et al. | | |
| 2014/0098893 | A1 * | 4/2014 | Ju | ........................ | H04N 19/127 |
| | | | | | 375/240.26 |

(Continued)

OTHER PUBLICATIONS

Author Unknown, "MIPI Alliance Standard for Display Serial Interface V1.0," MIPI Alliance, Inc., Apr. 5, 2006, 80 pages.

(Continued)

Primary Examiner — Benjamin X Casarez
(74) Attorney, Agent, or Firm — Withrow & Terranova, PLLC

(57) ABSTRACT

In an exemplary variable rate display interface, a high-speed reverse data transfer is enabled over plural lanes of a display serial interface (DSI) bus during blanking periods. Further increases in bandwidth of each high-speed reverse data transfer may be achieved by increasing DSI clock speed during the blanking periods. Since a display relies on a host clock to send reverse data, the frequency of the reverse data is increased, which effectively increases the bandwidth of reverse channel lanes. By increasing the reverse bandwidth over existing pins in the DSI bus, more data may be transferred to the host, including raw touch/stylus data rather than processed data. The raw data may then be processed by the host's relatively powerful processors. By shifting the processing to the host, the need for a powerful touch screen controller (TSC) and/or a powerful touch display driver integrated circuit (TDDI) may be avoided.

10 Claims, 9 Drawing Sheets

(56) References Cited

U.S. PATENT DOCUMENTS

| | | |
|---|---|---|
| 2014/0101357 A1 | 4/2014 | Stolitzka et al. |
| 2014/0112401 A1 | 4/2014 | Wiley et al. |
| 2015/0043693 A1* | 2/2015 | Lee .......................... G06F 13/36 375/354 |
| 2015/0063377 A1* | 3/2015 | Shui ...................... H04L 7/0037 370/517 |
| 2015/0130822 A1* | 5/2015 | Lee .......................... G09G 3/20 345/520 |
| 2015/0130824 A1 | 5/2015 | Lee et al. |
| 2015/0355762 A1* | 12/2015 | Tripathi ..................... G06T 1/20 345/173 |
| 2016/0034416 A1* | 2/2016 | Chavez ............... G06F 13/4282 381/59 |
| 2016/0043755 A1* | 2/2016 | Kim ..................... H04B 1/0483 375/295 |
| 2016/0170548 A1* | 6/2016 | Suzuki ................. G06F 3/0416 345/174 |
| 2016/0192360 A1* | 6/2016 | Lee ....................... H04W 4/005 370/336 |
| 2016/0282921 A1* | 9/2016 | Kodavalla ............... G06F 1/324 |
| 2017/0116150 A1* | 4/2017 | Wiley ................. G06F 13/4282 |
| 2017/0123472 A1* | 5/2017 | Kodavalla ............... G06F 1/324 |
| 2017/0154009 A1* | 6/2017 | Zhu ........................... G06F 1/08 |
| 2017/0208219 A1* | 7/2017 | Lee ...................... G09G 3/2096 |

OTHER PUBLICATIONS

Lawrence, Richard, "High-Speed Serial Interface for Mobile Displays," Proceedings of the 13th International Display Workshops, vol. 3, Dec. 8, 2006, 6 pages.

McCarty, Dennis, "Vertically Integrated MIPI Solutions," Arasan Chip Systems Inc. White Paper, Revision 0.9, Mar. 2, 2011, 17 pages.

International Search Report and Written Opinion for PCT/US2017/018560, dated May 16, 2017, 14 pages.

Mahmud, Rafey, "Techniques to make clock switching glitch free," EE Times, Jun. 26, 2003, 5 pages, retrieved from http://www.eetimes.com/document.asp?doc_id=1202359.

International Preliminary Report on Patentability for PCT/US2017/018560, dated Apr. 18, 2018, 15 pages.

\* cited by examiner

VARIABLE RATE DISPLAY INTERFACES

BACKGROUND

I. Field of the Disclosure

The technology of the disclosure relates generally to communications to and from displays on computing devices.

II. Background

Computing devices have become common in almost every facet of everyday activity. Almost every computing device has some form of user interface. Most such user interfaces include some way a user can provide input to the computing device as well as a display through which the user can receive output from the computing device. A relatively recent trend is the incorporation of a touch screen display that allows the input and the output functions to be combined in a single device.

Various specifications have been created that control how data is sent from a control system (sometimes referred to as a host) to a display device. When the display device was a simple device, the majority of the data was generated in a forward direction from the control system to the display device. That is, video data was sent from the host to the display device, and there was no, or very limited, signaling from the display device to the host. The MIPI® Alliance has provided the display serial interface (DSI) specification as one specification for data transfer between hosts and display devices. The DSI specification was originally designed to support primarily forward direction data. Reverse data channel support was envisioned only for small data traffic such as the occasional reading of a register and is generally considered a low-speed signal.

With the advent of touch screen displays, a need for a more robust reverse channel has emerged. While adding data lanes (sometimes called auxiliary lanes) through the addition of pins is one solution to provide additional reverse channel bandwidth, such approach is commercially impractical in view of the size penalties and expense associated with such additional pins. Thus, there needs to be a commercially practical way to increase bandwidth for reverse channel communication.

SUMMARY OF THE DISCLOSURE

Aspects disclosed in the detailed description include variable rate display interfaces. In an exemplary aspect, a high-speed reverse data transfer is enabled over plural lanes of a display serial interface (DSI) bus during blanking periods. Further increases in bandwidth of each high-speed reverse data transfer may be achieved by increasing DSI clock speed during the blanking periods. Since a display relies on a host clock to send reverse data, the frequency of the reverse data is increased, which effectively increases the bandwidth of reverse channel lanes. By increasing the reverse bandwidth over existing pins associated with data lanes in the DSI bus, more data may be transferred to the host, including raw touch/stylus data rather than processed data. The raw data may then be processed by the host's relatively powerful processors. By shifting the processing to the host, the need for a powerful touch screen controller (TSC) and/or a powerful touch display driver integrated circuit (TDDI) may be avoided. Likewise, memory requirements for any such TSC or TDDI may be minimized.

In this regard in one aspect, a host is disclosed. The host includes a host processor. The host also includes a clock source configured to generate a clock signal. The host also includes a DSI. The DSI includes a digital D-PHY element coupled to the clock source and the host processor. The digital D-PHY element is configured to receive the clock signal from the clock source and a data signal from the host processor. The DSI also includes an analog D-PHY element configured to be coupled to a DSI bus. The analog D-PHY element includes up to four data lanes and a clock lane. Each of a plurality of the up to four data lanes includes a high-speed receiver configured to receive high-speed reverse channel data from a display.

In another aspect, a client is disclosed. The client includes a display element configured to generate reverse channel data. The client also includes a client controller operatively coupled to the display element. The client also includes a DSI. The DSI includes a digital D-PHY element coupled to the client controller and configured to receive the reverse channel data. The DSI also includes an analog D-PHY element configured to be coupled to a DSI bus. The analog D-PHY element includes up to four data lanes and a clock lane. Each of a plurality of the up to four data lanes includes a high-speed transmitter configured to send high-speed reverse channel data to a host.

In another aspect, a host is disclosed. The host includes a host processor. The host also includes a clock source configured to generate a variable frequency clock signal. The host also includes a DSI. The DSI includes a digital D-PHY element coupled to the clock source and the host processor. The digital D-PHY element is configured to receive the variable frequency clock signal from the clock source and a data signal from the host processor. The DSI also includes an analog D-PHY element configured to be coupled to a DSI bus. The analog D-PHY element includes up to four data lanes and a clock lane. The variable frequency clock signal is higher during blanking periods.

In another aspect, a method of improving reverse channel lane bandwidth over a DSI bus is disclosed. The method includes providing a plurality of forward channel lanes over data lanes between a host and a display client. The method also includes providing at least two reverse channel lanes from the display client to the host over the data lanes.

DETAILED DESCRIPTION

Figure 1:
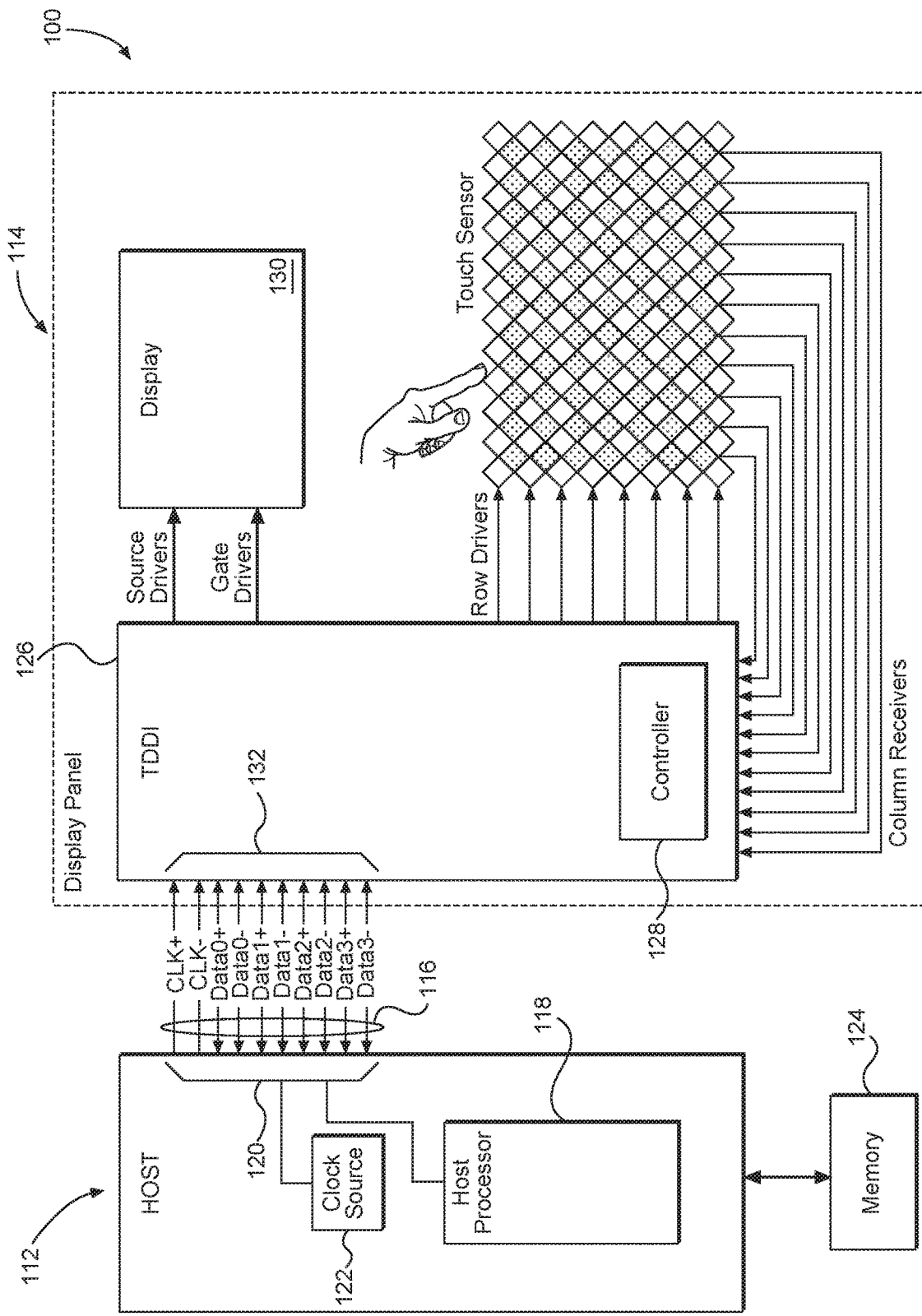
FIG. 1 is a block diagram of an exemplary computing system with a host and a client coupled by a display serial interface (DSI) bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include variable rate display interfaces. In an exemplary aspect, a high-speed reverse data transfer is enabled over plural lanes of a display serial interface (DSI) bus during blanking periods. Further increases in bandwidth of each high-speed reverse data transfer may be achieved by increasing DSI clock speed during the blanking periods. Since a display relies on a host clock to send reverse data, the frequency of the reverse data is increased, which effectively increases the bandwidth of reverse channel lanes. By increasing the reverse bandwidth over existing pins in the DSI bus, more data may be transferred to the host, including raw touch/stylus data rather than processed data. The raw data may then be processed by the host's relatively powerful processors. By shifting the processing to the host, the need for a powerful touch screen controller (TSC) and/or a powerful touch display driver integrated circuit (TDDI) may be avoided. Likewise, memory requirements for any such TSC or TDDI may be minimized.

In this regard, FIG. 1 is a simplified block diagram of an exemplary computing system 100 formed from a host 112 and a client 114 coupled by a bus 116. In an exemplary aspect, the host 112 is a first integrated circuit and includes a host processor 118 and an interface 120 that is configured to couple to the bus 116. Further, the host 112 may include a clock source 122. While the interface 120 is described in greater detail below with reference to FIG. 2, a brief overview is provided with reference to FIG. 1. The interface 120 may include pins (not illustrated) configured to convey data onto conductive elements within the bus 116. The pins effectively form lanes through which signals may be passed to and from the client 114. In an exemplary aspect, there are four data lanes (DATA0-DATA3) and a clock lane. The clock source 122 is used to provide a clock signal on the clock lane. In an exemplary aspect, the interface 120 generally complies with the DSI specification (i.e., the interface 120 may be a DSI bus interface) as modified by exemplary aspects of the present disclosure herein. In this exemplary aspect, it should be appreciated that the four data lanes are data lanes as defined by the DSI specification, and not auxiliary lanes. While a modified DSI specification is particularly contemplated, other specifications may also benefit from the present disclosure. The host 112 may further be associated with a memory 124.

With continued reference to FIG. 1, the client 114 may also be an integrated circuit and may include a TDDI 126 that includes a client microcontroller 128. Both the TDDI 126 and the client microcontroller 128 may be low-cost devices because exemplary aspects of the present disclosure eliminate the need for robust processing within the client 114. The TDDI 126 includes necessary and sufficient drivers (e.g., source drivers and gate drivers) to operate a display 130, which may be a liquid crystal display (LCD) or the like, based on data provided over the four data lanes. The client 114 further includes an interface 132 configured to couple to the bus 116 and as such may be a DSI bus interface. The interface 132 is described in greater detail below with reference to FIG. 3.

With continued reference to FIG. 1, the TDDI 126 receives data such as stylus input data, touch screen input data, gesture camera data, or the like. While there is an industry trend to integrate a TSC into the TDDI 126, the present disclosure focuses on providing raw data or slightly processed data to the host 112 so that the more powerful host processor 118 may process the data. Such arrangement may reduce the cost of the integrated circuit for the client 114 as well as reduce space and power consumption within the client 114. While the DSI specification contemplates a low-power data transfer (LPDT) reverse channel lane, such LPDT signals are generally limited to about 10 Mbps, which is too low to carry the raw data back to the host 112 effectively. Accordingly, in exemplary aspects of the present disclosure, a high-speed reverse channel is established on at least two of the four data lanes, and, in a further exemplary aspect, the high-speed reverse channel is established on all of the four data lanes (i.e., all four data lanes). Under the current proposals, the high-speed reverse channel data rate is one-fourth of the forward speed data rate. The one-fourth rate is a function of the source synchronous nature of the interface 120. That is, since there is no clock driven from the client 114 to the host 112, the system must compensate for potential jitter and drift. The simplest way to compensate is by using a slower rate, such as the one-fourth rate. Thus, for a 1 Gbps (e.g., using only a single lane) forward channel, the high-speed reverse channel would be 250 Mbps. Four lanes of 250 Mbps effectively creates a combined 1 Gbps reverse channel. In further exemplary aspects, the high-speed reverse channel is provided during blanking periods (i.e., when no forward data is present on the data lanes). Because there is no data on the forward channel, clock speed may be increased from the host 112, which in turn increases the data rate on the high-speed reverse channel. Note that the high-speed reverse channel may be formed from of any number of lanes in operation, and those lanes could theoretically be low-speed or high-speed. A lane provides a particular bandwidth in a forward or reverse direction, and the aggregate of bandwidths over all relevant lanes in any direction provides a data channel bandwidth in that direction.

Figure 2:
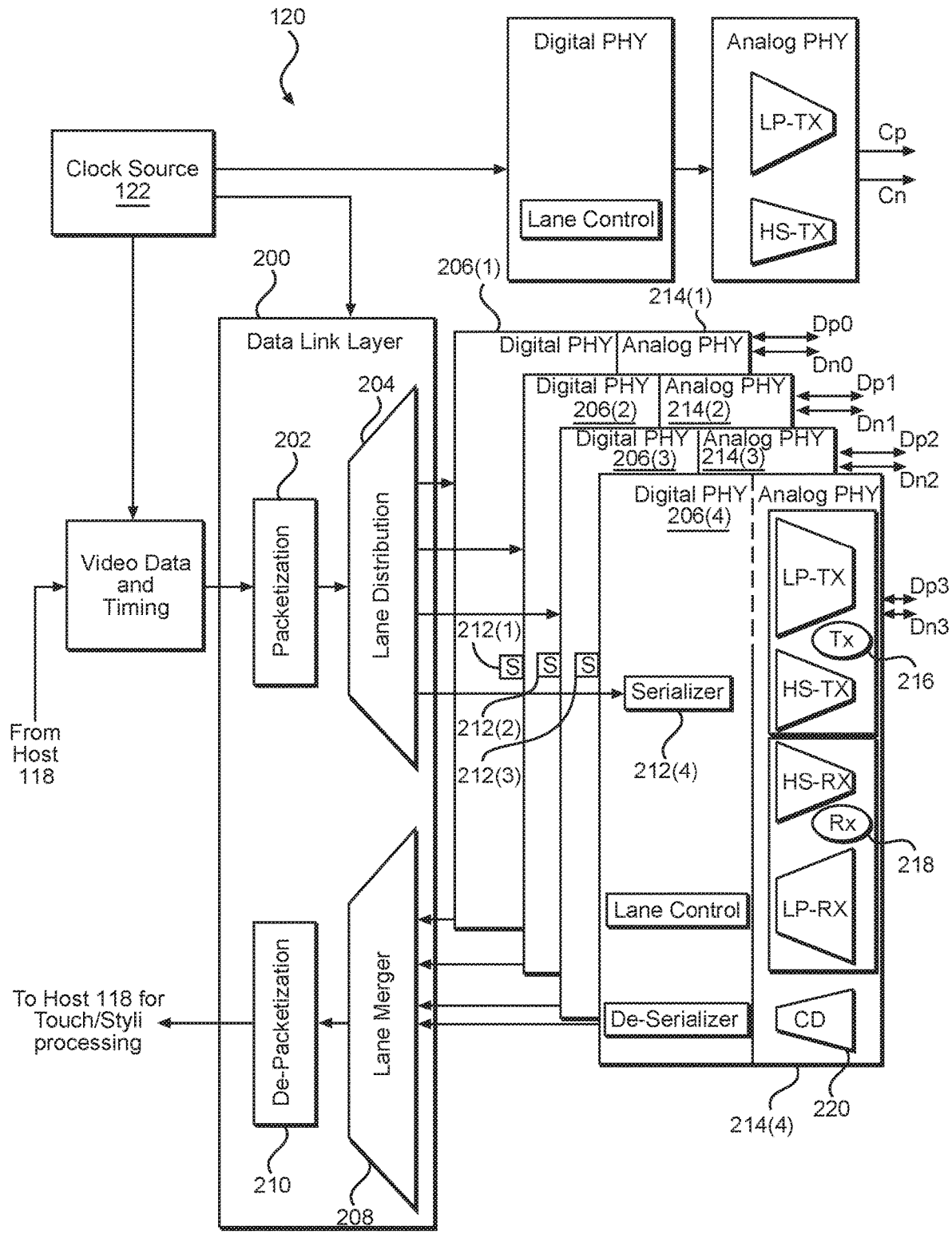
FIG. 2 is a block diagram of a physical layer of the host of FIG. 1.

Exemplary aspects of the present disclosure add respective high-speed receivers for each data lane to the interface 120 as better illustrated in FIG. 2. In an exemplary aspect, not illustrated, fewer than all four data lanes, but more than one data lane, are provided with a high-speed receiver. For maximum reverse channel bandwidth, all four data lanes are provided with the high-speed receivers. However, space constraints, cost, or other factors may necessitate compromising for fewer receivers. In this regard, FIG. 2 illustrates the interface 120 of FIG. 1. The interface 120 includes a data link layer 200, which in an exemplary aspect may be a DSI data link layer. The data link layer 200 receives a clock signal from the clock source 122 as well as video data and timing information from the host processor 118. Additionally, the data link layer 200 outputs touch and styli data to the host processor 118 for processing.

With continued reference to FIG. 2, the data link layer 200 includes a packetization logic element 202 that takes the video data and packetizes the video data before passing the packets to a lane distribution element 204. The lane distribution element 204 outputs packets to different ones of digital physical layers (PHY) 206(1)-206(4), where there is a PHY for each lane. The data link layer 200 further receives packets from the digital PHY 206(1)-206(4) at a lane merger element 208, which passes the packets to a de-packetization element 210 in the data link layer 200. Note that such a lane merger element 208 may be similar to conventional lane merger elements found in conventional clients. The de-packetized data is then passed to the host processor 118 for processing. In an exemplary aspect, this de-packetized data includes the raw touch/styli data from the display 130. By sending the raw data to the host processor 118 for processing, the need for complex processing by the client 114 is reduced. Thus, the client 114 may be less expensive, which may provide commercial advantage to the designers.

With continued reference to FIG. 2, each digital PHY 206(1)-206(4) includes a respective serializer 212(1)-212(4) that serializes the data from the lane distribution element 204 for the respective lane. Each digital PHY 206(1)-206(4) has an associated analog PHY 214(1)-214(4). Analog PHY 214(4) includes a transmitter 216 and a receiver 218 as well as a contention detection unit 220. While not illustrated, it should be appreciated that each analog PHY 214(1)-214(4) has a respective transmitter, receiver, and contention detection unit.

Figure 3:
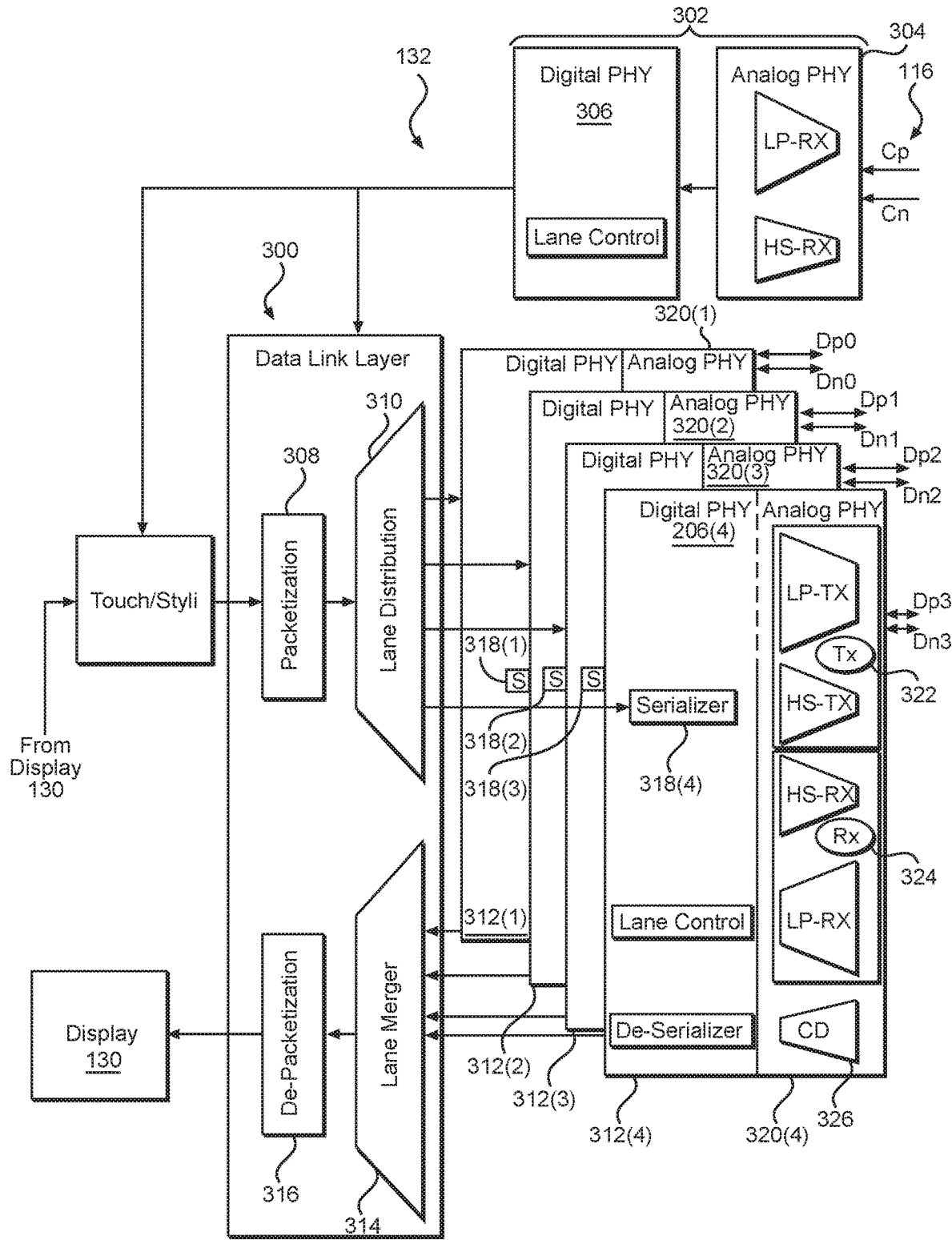
FIG. 3 is a block diagram of a physical layer of the client of FIG. 1.

FIG. 3 illustrates the interface 132 of FIG. 1. The interface 132 includes a data link layer 300, which in an exemplary aspect may be a DSI data link layer. The data link layer 300 receives touch and styli data from the display 130. Additionally, the data link layer 300 outputs video and timing data to the display 130 for output. Additionally, the data link layer 300 may receive a clock signal from a clock PHY 302. The clock PHY 302 includes an analog element 304 which receives the clock signal from the bus 116. The clock PHY 302 further includes a digital element 306 which includes lane control information processing.

With continued reference to FIG. 3, the data link layer 300 includes a packetization logic element 308 that takes the touch/styli data and packetizes before passing the packets to a lane distribution element 310. The lane distribution element 310 outputs packets to different ones of digital PHY 312(1)-312(4), where there is a PHY for each lane. The data link layer 300 further receives packets from the digital PHY 312(1)-312(4) at a lane merger element 314, which passes the packets to a de-packetization element 316 in the data link layer 300. Note that such a lane merger element 314 may be conventional. The de-packetized data is then passed to the display 130 for output. In an exemplary aspect, this de-packetized data includes the video and timing data.

With continued reference to FIG. 3, each digital PHY 312(1)-312(4) includes a respective serializer 318(1)-318(4) that serializes the data from the lane distribution element 310 for the respective lane. Each digital PHY 312(1)-312(4) has an associated analog PHY 320(1)-320(4). Analog PHY 320(4) includes a transmitter 322 and a receiver 324 as well as a contention detection unit 326. While not illustrated, it should be appreciated that each analog PHY 320(1)-320(4) has a respective transmitter, receiver, and contention detection unit.

As noted above, maximum reverse channel bandwidth is achieved if all four data lanes have high-speed reverse channel capability although having at least two such reverse channel options is an improvement.

Figure 4:
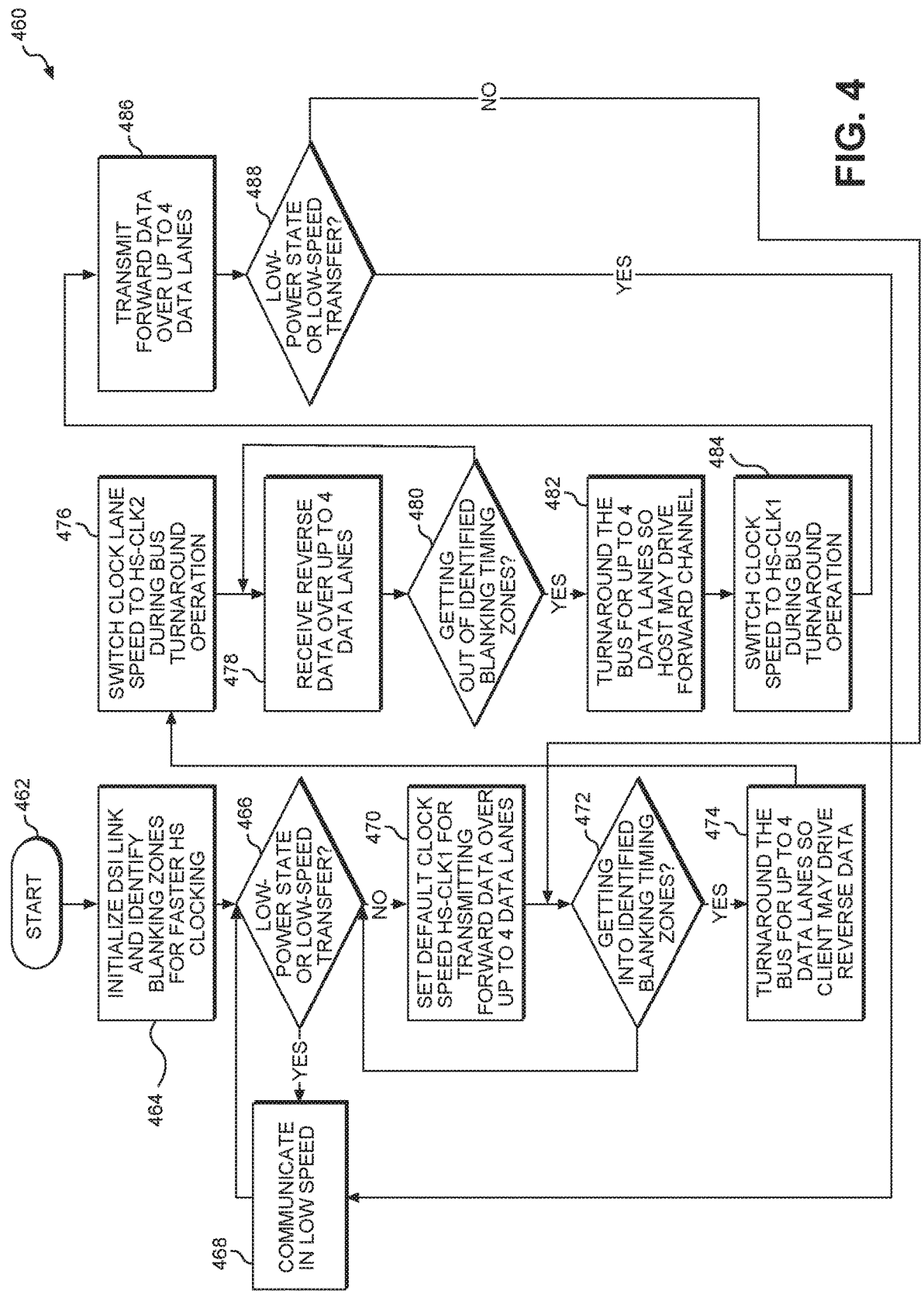
FIG. 4 is a flowchart illustrating exemplary processes associated with the present disclosure.

FIG. 4 is a flowchart illustrating a process 460 according to exemplary aspects of the present disclosure. The process 460 starts (block 462) and the host 112 initializes a DSI link to the client 114. The host 112 further identifies blanking zones (sometimes also referred to as blanking timing zones) for faster high-speed (referenced in the drawings as HS) clocking (block 464). The host 112 determines if the DSI 120 is in a low-power state or otherwise engaged in a low-speed transfer (block 466). If the answer to block 466 is yes, then the host 112 and the client 114 communicate using the low-speed transfer (block 468). When the low-speed transfer is complete, the host 112 returns to block 466.

With continued reference to FIG. 4, if the answer to block 466 is no, the DSI 120 is not in a low-power state, the process 460 continues such that the host 112 sets a default clock speed (referenced in the drawings as HS-CLK1) for transmitting the forward data over up to all of the four data lanes (block 470). A timing controller (not shown) within a display engine (not shown) of the host 112 then determines if display timing implies getting into the identified blanking timing zones (block 472). If the answer to block 472 is no, the process 460 continues to transmit the forward data. If, however, the answer to block 472 is yes, that the process 460 has entered an identified blanking timing zone, then the host 112 initiates a turnaround for the bus 116 for up to all of the four data lanes so the client 114 may drive reverse data back to the host 112 (block 474). Note that the bus turnaround operation allows support for bi-directionality due to the half-duplex nature of the DSI specification, and the relevant low-power handshake specification between the host 112 and the client 114 to turn the bus 116 around is already defined in the DSI and D-PHY specifications. The process 460 continues by switching the clock speed to a higher clock speed (referenced in the drawings as HS-CLK2) during the bus turnaround operation (block 476). The host 112 now may receive the reverse data on more than one data lane and up to all of the four data lanes (block 478). The host 112 determines if the display timing implies getting out of an identified blanking timing zone (block 480). If the answer to block 480 is no, then the host 112 continues to receive the reverse data. If, however, the answer to block 480 is yes, then the client 114 (which is following and aware of display "timing" operation via receiving timing signals like V-synch and H-synch from the host 112) initiates a turnaround of the bus 116 so that the host 112 can drive the forward channel (block 482).

With continued reference to FIG. 4, the host 112 switches the clock speed back to the default clock speed during the bus turnaround operation (block 484) which is initiated by the client 114. The host 112 then may transmit the forward data to the client 114 over up to all of the four data lanes (block 486). The host 112 determines if the host 112 has entered a low-power state or initiated a low-speed transfer (block 488). If the answer to block 488 is no, then the process 460 returns to block 472. If the answer to block 488 is yes, the process 460 returns to block 468.

Exemplary aspects of the present disclosure also provide flexibility for identifying candidate blanking zones for faster reverse operation rather than doing so everywhere during the blanking periods which may pose power impacts due to higher speeds. In other words, exemplary aspects support operating the reverse channel faster in the identified blanking zones to comply with touch/styli latency requirements while keeping the power in check. For example, exemplary aspects may enable faster reverse channel operation during every other active line, or once every few lines during display active or vertical blanking periods. At the start of the operation, the host 112 will configure the client 114 for those lines (active or blanking) during which the client 114 may have the chance to convey touch/styli data (if any) back to the host 112, either by issuing a READ request packet to the client 114 before turning the bus 116 around during those lines or not. The host 112 also configures the client 114 for reverse operation over plural lanes (up to four lanes) for faster reverse operation.

Figure 5:
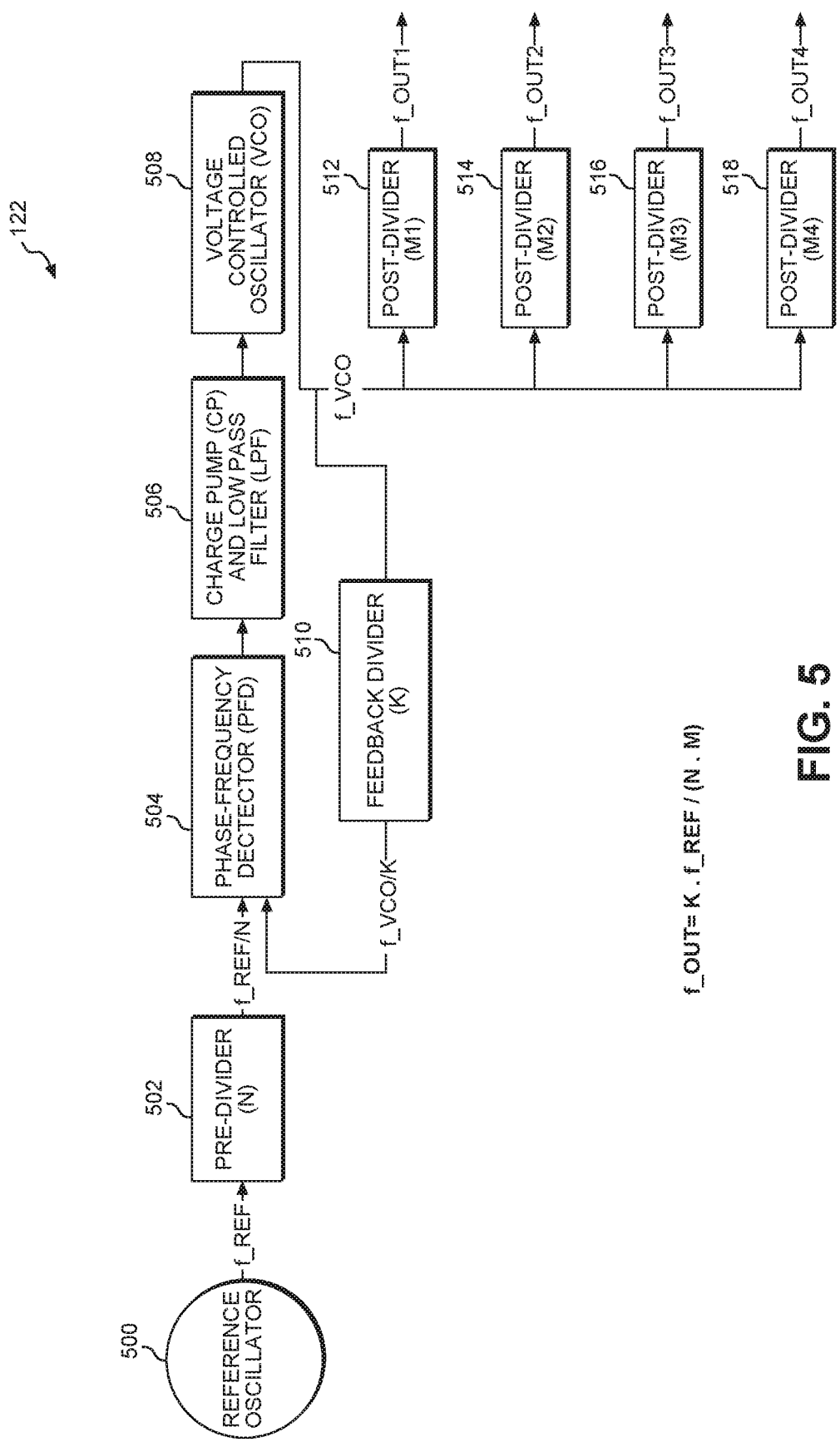
FIG. 5 is a simplified block diagram of a clock source with variable clock frequency according to an exemplary aspect of the present disclosure.

FIG. 5 illustrates a simplified block diagram of the clock source 122 of FIG. 1. A reference oscillator 500 outputs a reference frequency (referenced in the drawings as f_REF) to a pre-divider 502, which generates a divided reference frequency (referenced in the drawings as f_REF/N). The output of the pre-divider 502 is provided to a phase-frequency detector (PFD) 504, which compares the divided reference frequency to a feedback signal (referenced in the drawings as f_VCO/K) and drives a charge pump (CP) and low-pass filter (LPF) 506. The CP and LPF 506 drive a voltage controlled oscillator (VCO) 508 to generate an output frequency signal (referenced in the drawings as f_VCO). The output frequency signal is provided to a feedback divider 510, which generates the feedback signal, and is also provided to post-dividers 512, 514, 516, and 518, which may divide the output frequency signal by different values to arrive at different outputs (referenced in the drawings as f_OUT1, f_OUT2, f_OUT3, and f_OUT4), respectively. The different values may be used for the default clock speed, the higher clock speed, or other signals as needed or desired.

It should be appreciated that blanking is a known phenomenon in video signals. To this end, formula Eq. 1 below demonstrates the relationship between display interface speed and resolution/blanking_ratio/frame rates, where f is the link speed in pixels per clock (not bits per clock).

$$f = (\text{active area in pixels} * \text{frame rate})/(1 - \text{blanking\_ratio}) \quad (\text{Eq. 1})$$

Note that or a fixed frame rate and blanking_ratio, increasing f for reverse direction implies higher resolutions and therefore higher touch/styli raw data bandwidth support.

One could increase blanking_ratio while dropping frame rate to keep f constant. This increase in blanking could open more room for reverse channel data due to larger blanking periods. However, dropping frames may cause artifacts for the video signals. Thus, the present disclosure proposes using a dynamically changing clock during the blanking periods to increase reverse channel bandwidth. The host 112 can absorb circuitry required to effectuate the dynamically changing clock (e.g., a variable K in the feedback divider 510 and/or the post-dividers 512, 514, 516, and/or 518). The client 114 continues to follow the clock signal from the clock source 122, due to the source synchronous nature of the DSI specification. Thus, the cost of the circuitry in the client 114 may not change, yet the benefits of larger reverse channel signaling are provided. It should be appreciated that the host 112 guarantees sending the V-synch and H-synch timing signals to the client 114 at proper exact times (i.e. with minimal jitter) to avoid visual artifacts. The minimal jitter is preserved regardless of whether the host 112 is driving a constant or a variable frequency clock.

Figure 6:
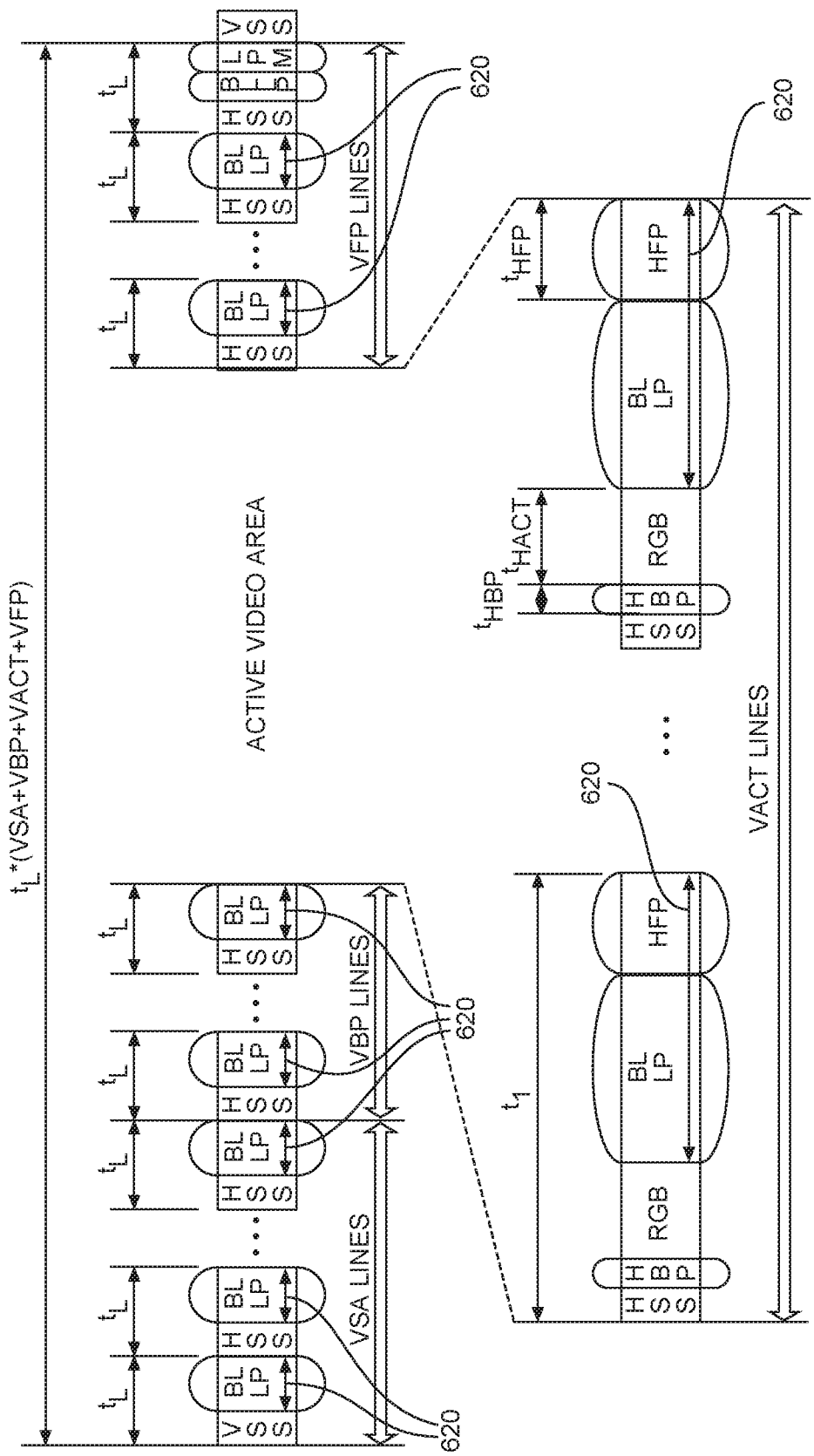
FIG. 6 illustrates blanking zones that may be used for reverse channel lane signaling according to the DSI specification.

FIG. 6 illustrates candidate blanking zones 620 highlighted by arrows which may be identified by the process 460 of FIG. 4 for higher-speed reverse channel operation. In particular, FIG. 6 illustrates the MIPI Alliance Specification for video mode DSI burst transmission. Due to larger blanking areas available during vertical blanking periods, compared to horizontal blanking periods, one may opt for supporting the higher-speed reverse operation in the vertical blanking periods only. However, for a 60 Hz display refresh rate, that would imply touch/styli coordinates "report latency" of 16.66 ms which would violate maximum latency criteria of some operating systems like Microsoft® Windows (i.e., maximum 10 ms touch report rate implying 100 Hz minimum display refresh rate). Therefore, one may need to convey touch/styli reverse data during the horizontal blanking zones as well as the vertical blanking zones.

Figure 7:
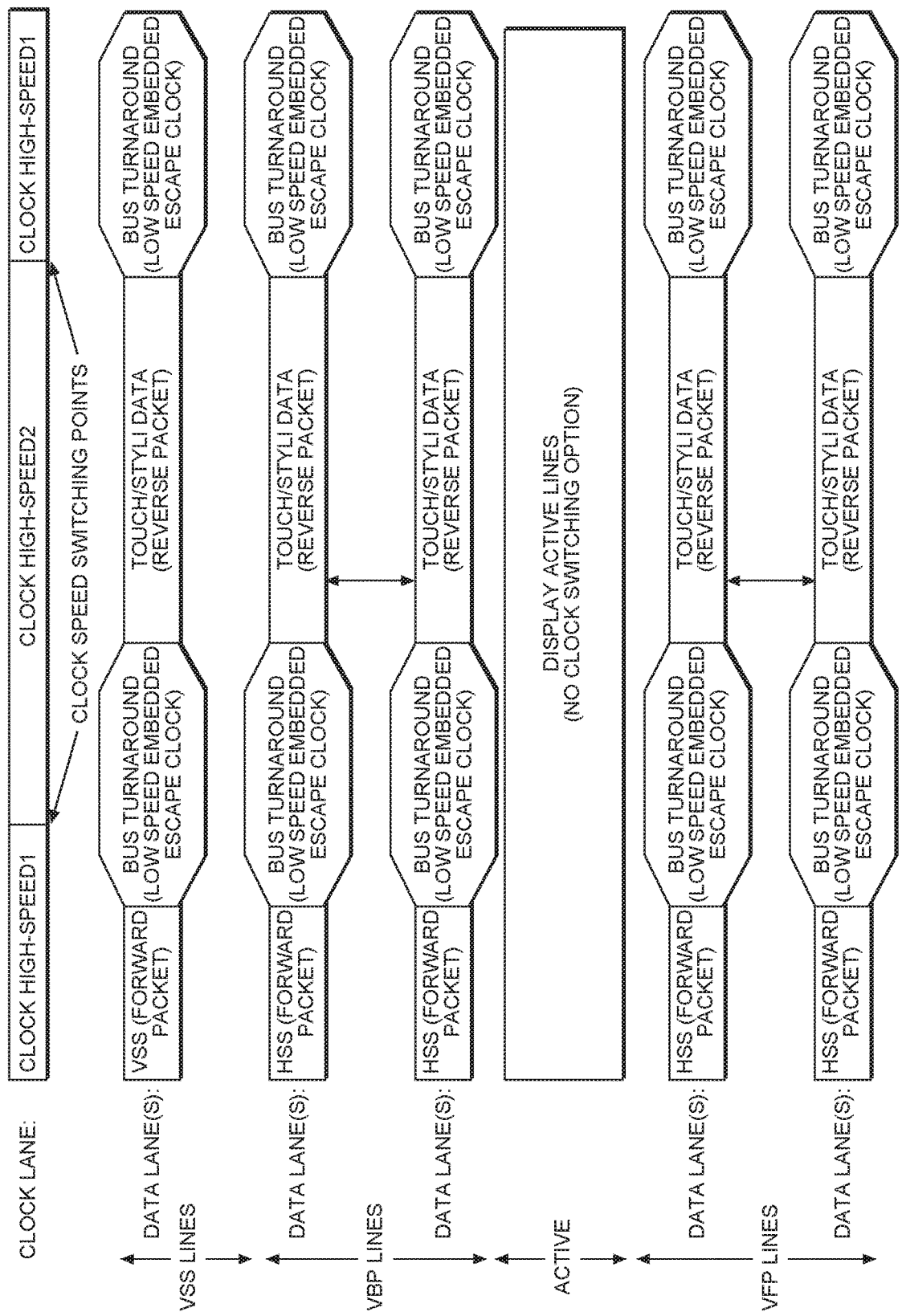
FIG. 7 illustrates clock switching during vertical blanking.

FIG. 7 illustrates a clock switching mechanism during candidate vertical blanking periods only (i.e., no clock switching during the horizontal blanking periods of active display lines). For completeness, the acronyms are expanded as follows: vertical sync start packet (VSS); blanking or low-power packet (BLLP); vertical sync active (VSA); vertical back porch (VBP); vertical front porch (VFP); horizontal sync start packet (HSS); horizontal back porch packet (HBP); horizontal front porch packet (HFP); time line (tL); and vertical active (VACT). The clock lane speed may switch safely during low-speed bus turnaround cycles of data lanes to ensure stability of a high-speed clock for the next high-speed data transfer cycle.

Figure 8:
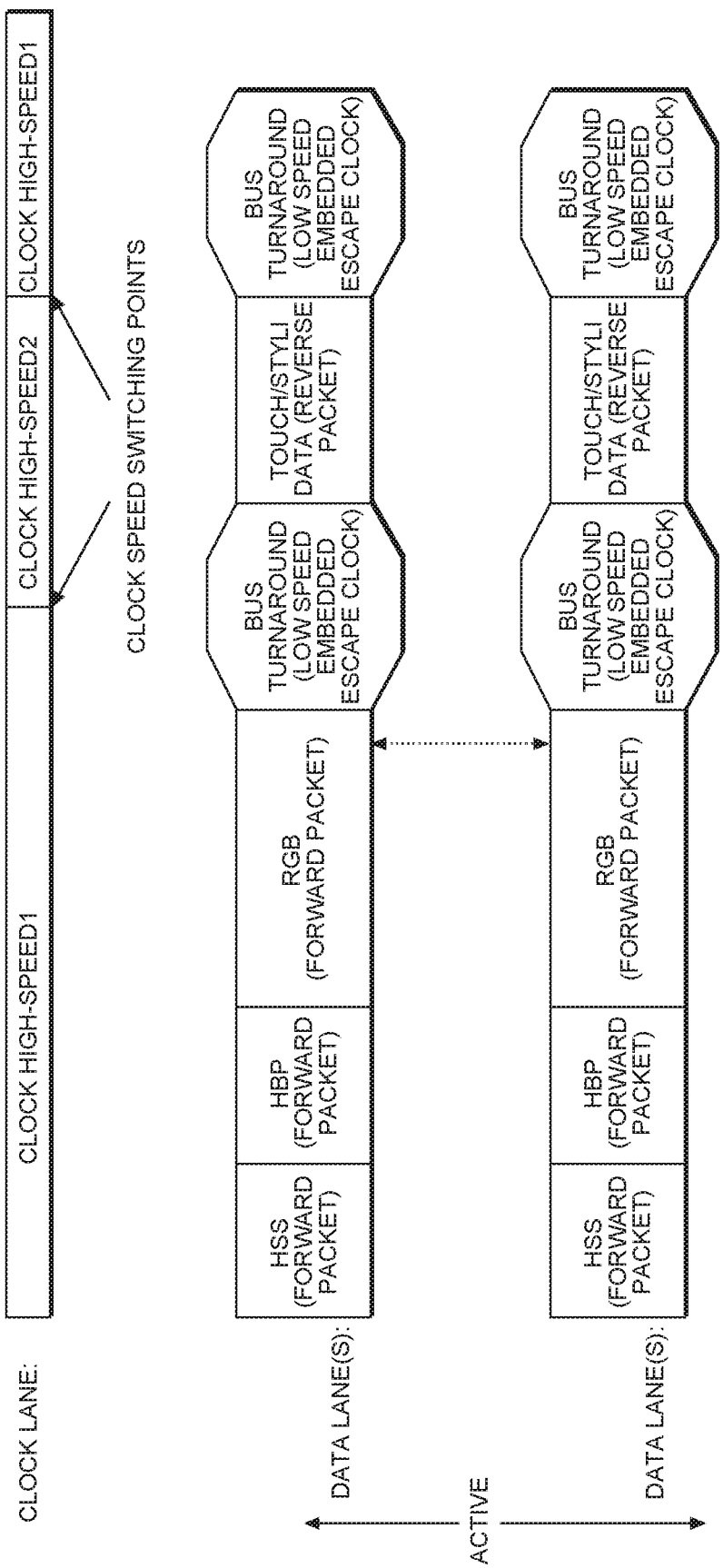
FIG. 8 illustrates switching the clock during display active lines.

FIG. 8 illustrates switching the clock during candidate horizontal blanking zones of active lines as well (e.g., one may do this to comply with the less than 16.66 ms touch/stylus report latency requirements of some operating systems). Increasing the clock speed during the blanking periods is particularly attractive for increasing the reverse channel bandwidth of a half-duplex bus like a DSI bus. The client 114 may automatically start sending touch/styli reverse data packets back to the host 112 after the bus turnaround operation as illustrated in FIGS. 7 and 8. Alternatively, the host 112 may issue the READ request packet before the bus turnaround operation to the client 114 for obtaining the touch/styli data. For optimal results, the clock lane speed switching will be glitch free.

The computing system 100 of FIG. 1 according to aspects disclosed herein may be provided in or integrated into any processor-based device with associated display. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
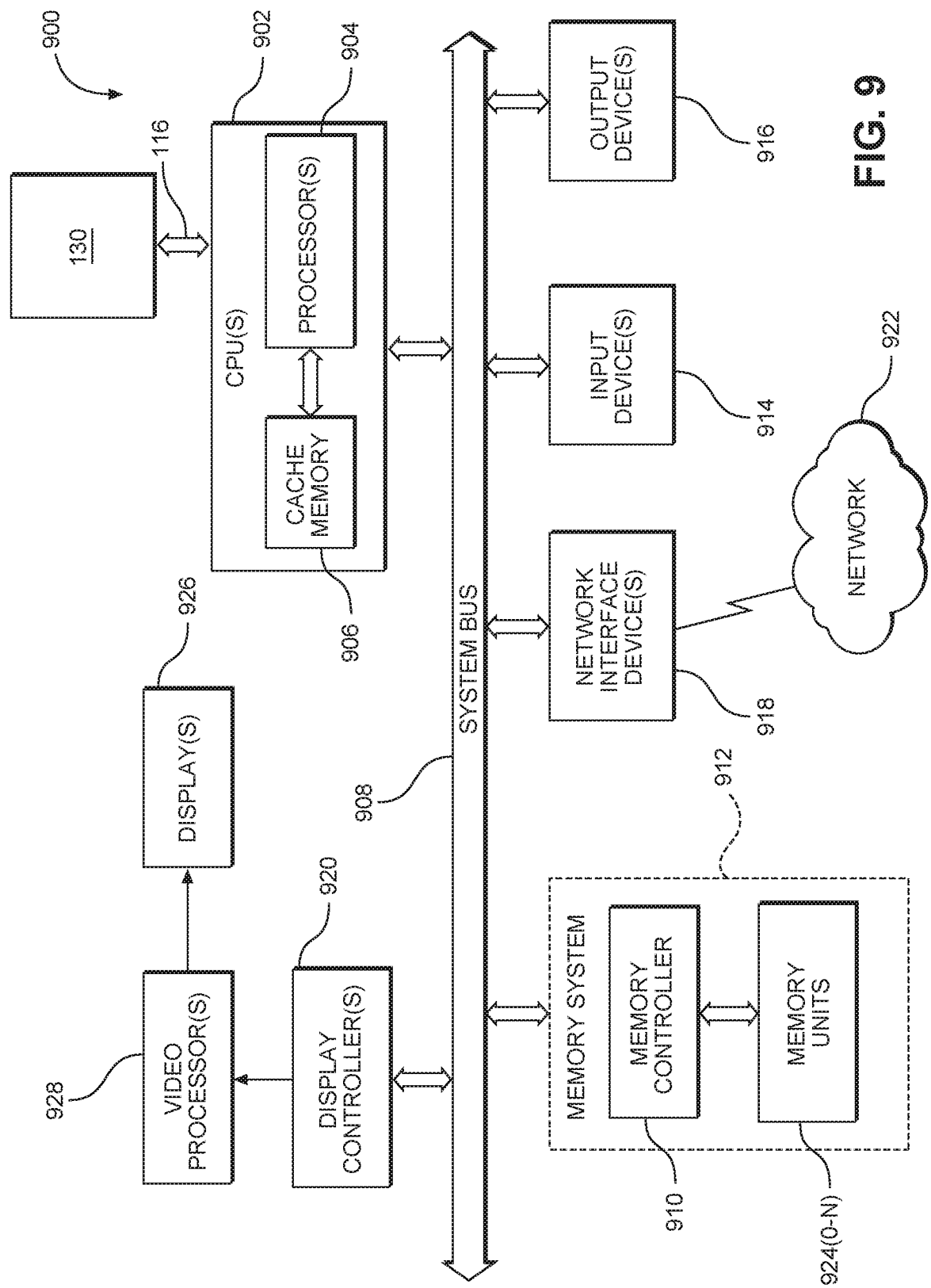
FIG. 9 is a block diagram of an exemplary processor-based system that can include the computing system of FIG. 1.

In this regard, FIG. 9 illustrates an example of a processor-based system 900 that can employ the computing system 100 illustrated in FIG. 1. In this example, the processor-based system 900 includes one or more central processing units (CPUs) 902, each including one or more processors 904. The CPU(s) 902 may be the host processor 118. The CPU(s) 902 may have cache memory 906 coupled to the processor(s) 904 for rapid access to temporarily stored data. The CPU(s) 902 is coupled to a system bus 908 and can intercouple master and slave devices included in the processor-based system 900. As is well known, the CPU(s) 902 communicates with these other devices by exchanging address, control, and data information over the system bus 908. For example, the CPU(s) 902 can communicate bus transaction requests to a memory controller 910 as an example of a slave device. Although not illustrated in FIG. 9, multiple system buses 908 could be provided, wherein each system bus 908 constitutes a different fabric.

Other master and slave devices can be connected to the system bus 908. As illustrated in FIG. 9, these devices can include a memory system 912, one or more input devices 914, one or more output devices 916, one or more network interface devices 918, and one or more display controllers 920, as examples. The input device(s) 914 can include any type of input device, including, but not limited to, input keys, switches, voice processors, touch, styli, etc. Note that while illustrated as being attached to the system bus 908 as separate elements, an integrated touch screen display 130 may be coupled to the CPU 902 through a DSI bus 116. The output device(s) 916 can include any type of output device, including, but not limited to, audio, video, other visual indicators, etc. The network interface device(s) 918 can be any devices configured to allow exchange of data to and from a network 922. The network 922 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 918 can be configured to support any type of communications specification desired. The memory system 912 can include one or more memory units 924(0-N).

The CPU(s) 902 may also be configured to access the display controller(s) 920 over the system bus 908 to control information sent to one or more displays 926. The display controller(s) 920 sends information to the display(s) 926 to be displayed via one or more video processors 928, which process the information to be displayed into a format suitable for the display(s) 926. The display(s) 926 can include any type of display, including, but not limited to, a cathode ray tube (CRT), an LCD, a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A host comprising:
    a host processor;
    a timing controller;
    a clock source configured to generate a clock signal; and
    a display serial interface (DSI) comprising:
        a digital physical layer (PHY) element coupled to the clock source and the host processor and configured to receive the clock signal from the clock source and a data signal comprising video data and timing information from the host processor; and
        an analog PHY element configured to be coupled to a DSI bus, the analog PHY element comprising up to four DSI data lanes and a clock lane, wherein each of the up to four DSI data lanes comprises a high-speed transmitter configured to transmit high-speed forward data to a display and a high-speed receiver configured to receive high-speed reverse channel data from the display;
    wherein the timing controller is configured to:
        identify a blanking zone in the high-speed forward data over the up to four DSI data lanes based on the timing information; and wherein the host is configured to:
during the blanking zone, initiate a turnaround of the DSI bus such that each high-speed receiver of the up to four DSI data lanes receives the high-speed reverse channel data from the display.

2. The host of claim 1, wherein the up to four DSI data lanes comprises four DSI data lanes.

3. The host of claim 1, wherein the clock source is configured to increase a frequency of the clock signal during selected blanking zones based on a frame rate associated with the display.

4. The host of claim 1, further comprising at least one auxiliary lane.

5. The host of claim 1, wherein the host processor is configured to process raw data received from the display during the blanking zone.

6. The host of claim 5, wherein the raw data comprises touch/styli data.

7. The host of claim 5, wherein the raw data comprises gesture camera data.

8. The host of claim 1, wherein the timing controller is configured to identify the blanking zone in the high-speed forward data over the up to four DSI data lanes based on the timing information by:
identifying a plurality of candidate blanking zones based on the timing information; and
selecting the blanking zone in the high-speed forward data by selecting from the plurality of candidate blanking zones based on at least one of power impact or a latency requirement for the high-speed reverse channel data.

9. The host of claim 1, wherein the host is further configured to issue a read request over the up to four DSI data lanes before initiating the turnaround of the DSI bus to initiate transmission of the high-speed reverse channel data by the display.

10. A host comprising:
a host processor;
a timing controller;
a clock source configured to generate a variable frequency clock signal; and
a display serial interface (DSI) comprising:
a digital physical layer (PHY) element coupled to the clock source and the host processor and configured to receive the variable frequency clock signal from the clock source and a data signal comprising video data and timing information from the host processor; and
an analog PHY element configured to be coupled to a DSI bus, the analog PHY element comprising up to four DSI data lanes and a clock lane, wherein each of the up to four DSI data lanes comprises a high-speed transmitter configured to transmit high-speed forward data to a display and a high-speed receiver configured to receive high-speed reverse channel data from the display;
wherein the timing controller is configured to:
identify a blanking zone in the high-speed forward data over the up to four DSI data lanes based on the timing information; and
wherein the host is configured to:
initiate a turnaround of the DSI bus during the blanking zone such that each high-speed receiver of the up to four DSI data lanes receives the high-speed reverse channel data; and
during the blanking zone, increase a frequency of the variable frequency clock signal.

* * * * *